United States Patent
Janakiraman et al.

(10) Patent No.: US 7,668,907 B1
(45) Date of Patent: Feb. 23, 2010

(54) METHOD AND SYSTEM FOR SELECTIVELY VIEWING PARTICIPANTS OF A MULTIMEDIA NETWORK CONFERENCE

(75) Inventors: Mathrubootham Janakiraman, Redmond, WA (US); Kyle A. Larsen, Mercer Island, WA (US); Senthil K. Velayutham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 09/931,211

(22) Filed: Aug. 16, 2001

(51) Int. Cl.
*G06F 15/16* (2006.01)
(52) U.S. Cl. ....................... 709/204; 709/228
(58) Field of Classification Search ......... 709/200–225, 709/227–248; 370/260–265; 379/90; 725/38, 725/54
See application file for complete search history.

(56) References Cited

U.S. PATENT DOCUMENTS

| | | | |
|---|---|---|---|
| 5,422,883 A | 6/1995 | Hauris et al. | |
| 5,526,354 A | 6/1996 | Barraclough et al. | |
| 5,686,957 A | 11/1997 | Baker | |
| 5,745,380 A * | 4/1998 | Sandvoss et al. | 379/90.01 |
| 5,828,838 A * | 10/1998 | Downs et al. | 709/204 |
| 5,916,302 A * | 6/1999 | Dunn et al. | 709/204 |
| 5,963,547 A * | 10/1999 | O'Neil et al. | 370/260 |
| 5,983,192 A * | 11/1999 | Botzko et al. | 704/500 |
| 6,031,549 A * | 2/2000 | Hayes-Roth | 345/474 |
| 6,128,649 A * | 10/2000 | Smith et al. | 709/217 |
| 6,178,424 B1 * | 1/2001 | Okumura et al. | 707/10 |
| 6,237,040 B1 * | 5/2001 | Tada | 709/246 |
| 6,269,483 B1 * | 7/2001 | Broussard | 725/143 |
| 6,317,776 B1 * | 11/2001 | Broussard et al. | 709/204 |
| 6,332,153 B1 * | 12/2001 | Cohen | 709/204 |
| 6,343,313 B1 * | 1/2002 | Salesky et al. | 709/204 |
| 6,353,848 B1 * | 3/2002 | Morris | 709/203 |
| 6,564,261 B1 * | 5/2003 | Gudjonsson et al. | 709/227 |
| 6,577,333 B2 * | 6/2003 | Tai et al. | 348/14.08 |
| 6,603,501 B1 * | 8/2003 | Parry et al. | 348/14.12 |
| 6,757,259 B1 * | 6/2004 | Hamilton | 370/260 |
| 6,775,247 B1 * | 8/2004 | Shaffer et al. | 370/260 |
| 6,839,417 B2 * | 1/2005 | Weisman et al. | 379/204.01 |
| 6,907,449 B2 * | 6/2005 | Srinivasan | 709/204 |
| 7,007,098 B1 * | 2/2006 | Smyth et al. | 709/233 |
| 7,188,193 B1 * | 3/2007 | Getsin et al. | 709/248 |
| 7,272,657 B2 * | 9/2007 | Allen et al. | 709/231 |
| 7,512,698 B1 * | 3/2009 | Pawson | 709/231 |
| 2002/0194302 A1 * | 12/2002 | Blumberg | 709/217 |

OTHER PUBLICATIONS

"H.323 Support in Exchange 2000 Conferencing Server," White Paper, May 2000 (7 pgs.).

* cited by examiner

*Primary Examiner*—Asad M Nawaz
(74) *Attorney, Agent, or Firm*—Senniger Powers LLP (57) ABSTRACT

In a network multimedia conference, a bridge service that functions as a proxy for a client to join the conference dynamically selects a video stream from multiple video streams originating from the other participants of the conference and sends the selected video stream to the client for viewing. The bridge service monitors conferencing events of each participant and updates conferencing activity state variables of the participant, such as whether the participant is being shown to the client, whether the participant is talking, how long the participant has been shown or not shown, etc. Periodically, a weight assigned to each of the participants is computed based on the state variables, and the video stream of the participant with the highest weight is then selected for viewing by the client.

20 Claims, 8 Drawing Sheets

METHOD AND SYSTEM FOR SELECTIVELY VIEWING PARTICIPANTS OF A MULTIMEDIA NETWORK CONFERENCE

TECHNICAL FIELD OF THE INVENTION

This invention relates generally to network communications, and more particularly to multimedia conferences over a network, such as the Internet.

BACKGROUND OF THE INVENTION

Multimedia conferencing has become one of many important applications of network communications, especially over the Internet. Multimedia conferencing is preferably carried out in a multicast mode to enable real-time interactions among several participants, where each participant can see video signals and hear sounds of the other participants. To participate in a multimedia conference, a user of a client machine uses a multimedia conferencing component, which may be a component of a Web browser, to place a multicast call to the other participants. The multimedia traffic from all participants is sent to the multicast address associated with the conference, and each client listening on that address is capable of simultaneously receiving and rendering multimedia streams from all the other clients. In this way, the user is able to hear all the other participants and see them simultaneously in different video windows.

Multimedia conferencing using the multicast technology requires that all of the clients participating in the video conference be connected together by a multicast-enabled network, and all of the clients be multicast-capable. There are, however, many network clients that are not able to participate in a network conference in the multicast mode because either they do not have multicast capabilities or they reside on networks that cannot form a multicast connection to the conference server. Due to the large number of such clients, it is desirable to provide ways for them to participate in a multimedia network conference.

One proposed way to allow a client that is not able to join a network conference in the multicast mode to still participate in the conference is to have the client place a point-to-point call to a bridge service that is multicast capable and connected to the multicast network. The bridge service then joins the conference on behalf of the client. During the conference, the audio and video streams generated by the client is unicast to the bridge service. The bridge service functions as a proxy of the client by forwarding conference traffic from this client to the other participants, and to forward conference traffic originating from the other participants to the client.

One problem with the use of a bridge service, however, is that the unicast client is not able to see all the other participants at the same time. While a multicast participant can receive the multiple video data streams from all the other participants, the point-to-point connection between the unicast client and the bridge service is capable of handling and rendering only a single video substream from one participant. In other words, the unicast client can only see one of the other participants at a time. The difficulty is in deciding which video substream should be presented to the unicast client for viewing. Thus, there exists a need for an intelligent way for the bridge service to select one video substream from all the video substreams originated from multiple conference participants for viewing by the client. The resulting user experience should be seamless and adaptive to different scenarios of conference dynamics.

SUMMARY OF THE INVENTION

In view of the foregoing, the present invention provides a method and system for intelligently selecting a single video stream from video streams originating from multiple participants of a multimedia network conference and sending the selected video stream to a client for viewing. In accordance with the invention, participant events of each participant are monitored and used to update conferencing activity state variables of the participant, such as whether the participant is being shown to the client, how long the participant has been shown or not shown, etc. Periodically, a weight is computed for each of the participants based on the activity state variables. The participant with the highest weight among all the participants is then selected for viewing by the client, i.e., the video stream from that participant is sent to the client.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
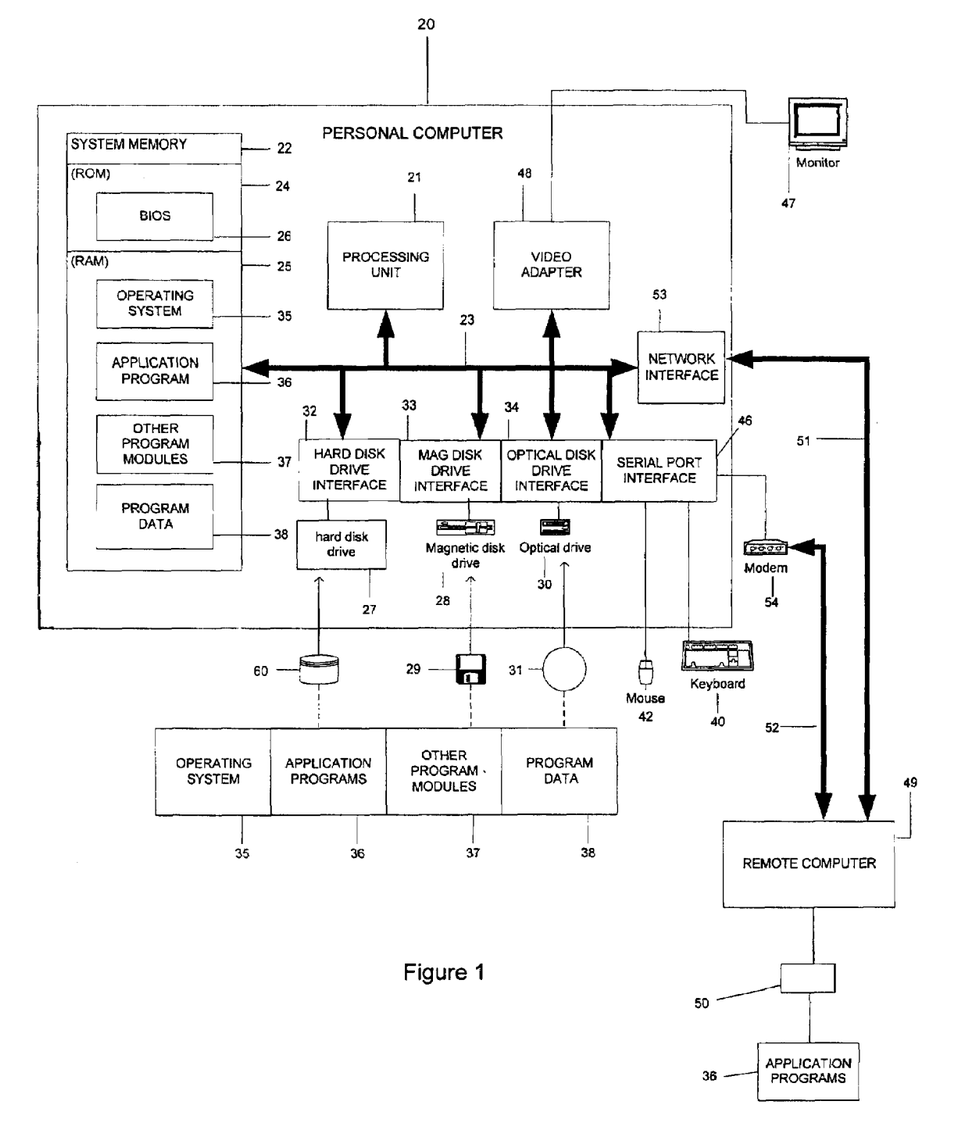
FIG. 1 is a block diagram generally illustrating an exemplary computer system on which the present invention may be implemented.

The following description begins with a description of a general-purpose computing device that may be used in an exemplary system for implementing the invention, and the invention will be described in greater detail with reference to FIGS. 2-4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
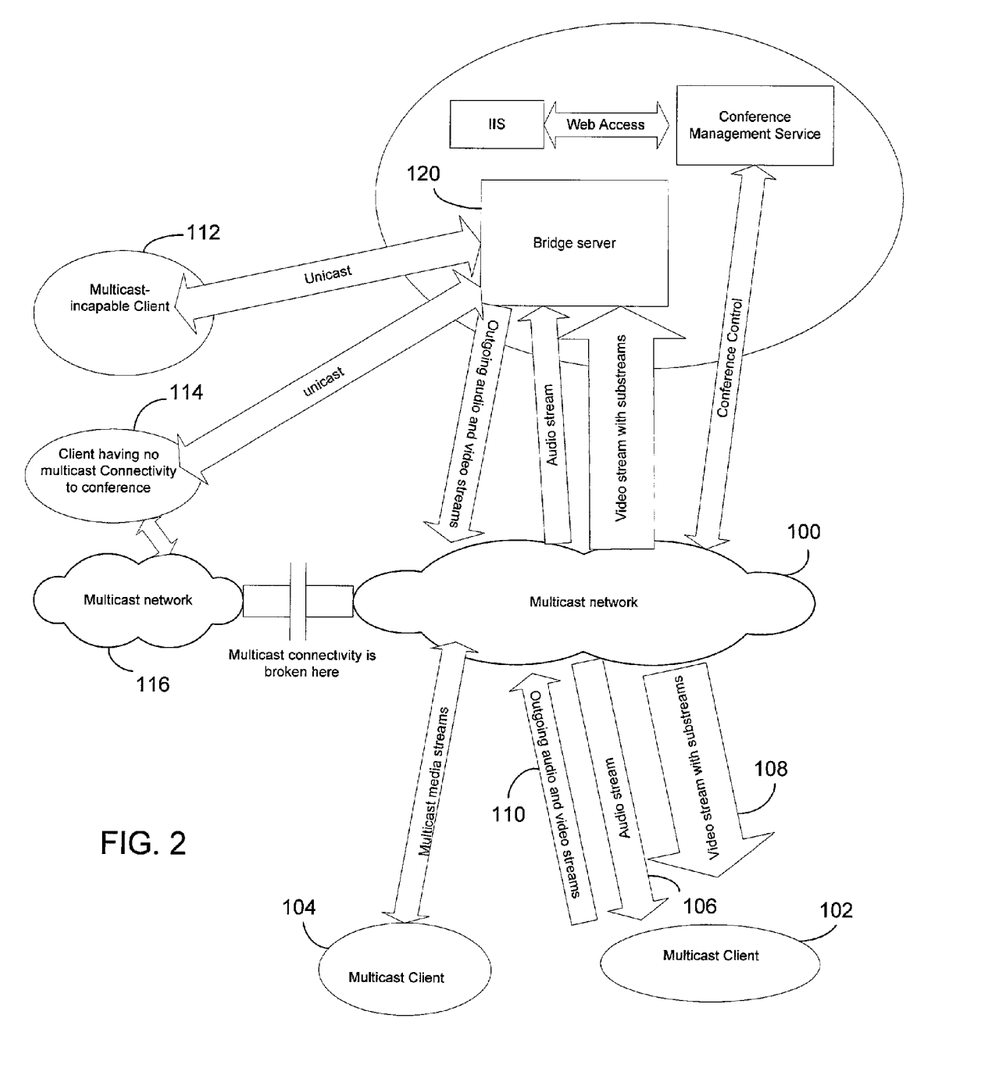
FIG. 2 is a schematic diagram illustrating an embodiment of the invention in which a bridge server functions as a proxy of a client for participating in a multimedia conference.

Referring now to FIG. 2, the present invention is directed to an intelligent way to select one of multiple video streams originated from participants of a multimedia network conference for viewing by a client that is connected to the conference via a link that can only carry the video stream of one of the participants. A multimedia conference over a network often has more than two participants, and it is desirable to allow a participant of the conference to hear and see the other participants at the same time. To that end, multimedia network conferencing is often intended to be carried out over a multicast-enabled network, such as the network 100. The multicast-enabled network 100 allows a multicast-capable client to simultaneously receive video and audio steams from all the other participants.

For illustration purposes, FIG. 2 shows two multicast-capable clients 102 and 104 connected to the multicast network 100. In one implementation of multicast conferencing, during the conference, each multicast client is provided with an audio stream 106 that contains a mixture of audio streams from all the other participants, and a video stream 108 that can be demultiplexed into individual video substreams, each substream representing one participant. Thus, a participant using a multicast client can view all the other participants at the same time, such as in different windows on the computer screen, and hear them together. The audio and video streams 110 of the multicast client are also sent to the multicast network for delivery to all the other participants.

Although multicasting is the preferred mode for delivering and receiving the multimedia conferencing data traffic, there are many client machines that are not able to participate in network conferences in the multicast mode. Some of those clients, such as the client 112, may simply be incapable of multicasting due to the lack of a multicast technology provider component. Others, such as the client 114, may be capable of multicasting but is not multicast-connected with the multicast network 100 that carries the multicast conferencing traffic. As shown in FIG. 2, the client 114 may be connected to a multicast network 116 but cannot form a multicast connection with the network 110 because the connectivity between the two multicast networks is broken.

Nevertheless, a client that is not multicast-capable or multicast-connected can still participate in a network conference through a bridge server. As shown in FIG. 2, the bridge server 120 is connected to the multicast network 100 that carries the conference traffic and is multicast-capable. The bridge server 120 functions as a proxy for connecting the client 112 to a multimedia conference. When the client 112 wants to participate in a multimedia network conference, it places a point-to-point call to the bridge server 120 with information identifying the conference it wants to join. The bridge server, on behalf of the client, then joins the multicast group defining the conference.

Figure 3:
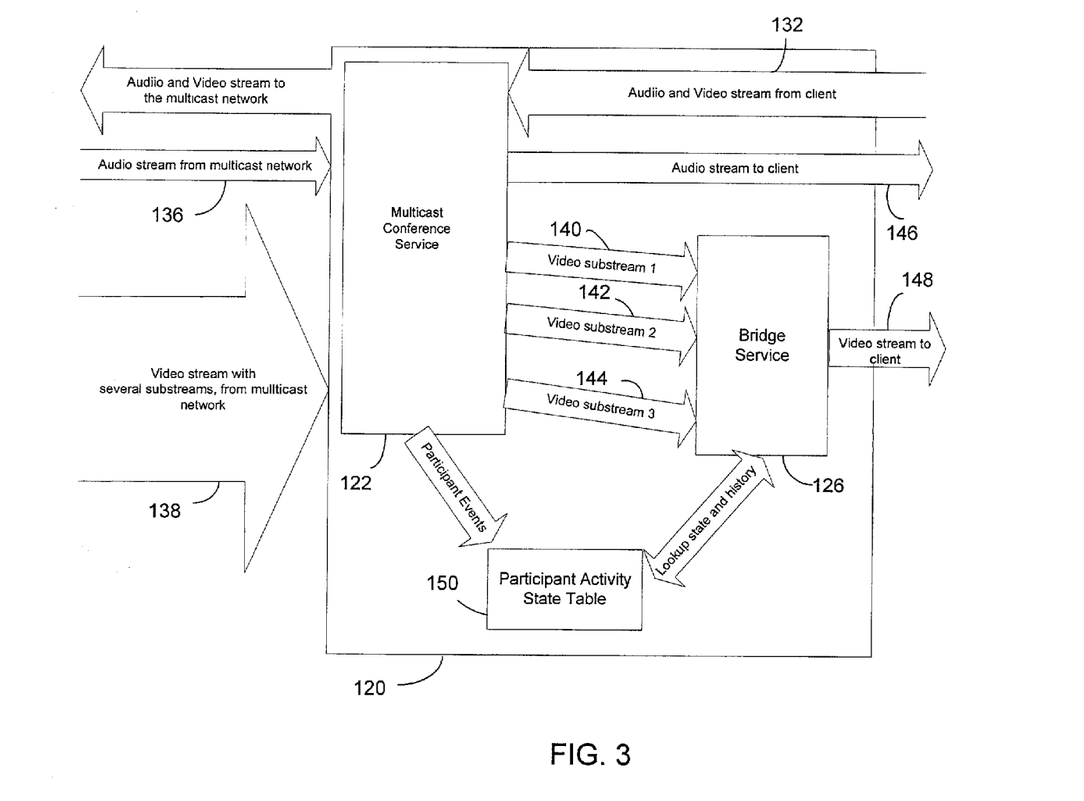
FIG. 3 is a schematic diagram showing flows of multimedia streams through the bridge server in the embodiment of FIG. 2.

Turning now to FIG. 3, during the conference, the bridge server 120 receives a video and audio stream 132 from the client and relays it to the multicast host group, thereby enabling other multicast clients that are already in the conference to see the client. The bridge server 120 also receives the video and audio data from the other participants. In one implementation as shown in FIG. 3, a multicast conference server 122 of the bridge server 120 receives one audio stream 136 and one video stream 138 for the conference from the multicast network. The audio stream 136 contains a mixture of audio data from the other participants. The video stream 138 contains several substreams, each carrying video data from one participant.

The multicast conference server 122 demultiplexes the received video stream into individual video substreams 140, 142, 144. These substreams are sent to a bridge service component 126 of the bridge server 120, which is responsible for selecting one of the substreams for forwarding to the client. The multimedia conferencing data are sent to the client in the form of single audio stream 146 and a single video stream 148. The audio stream 146 contains a mixture of audio streams from all the other participants of the conference. In contrast, the video stream 148 contains only one video substream representing only one of the participants. In other words, the client can only see one of other participants at a time. Since only one of the video streams received by the bridge server from the other conference participants will be sent to the client, the question is how to make the selection.

The present invention provides an intelligent way to select one video stream out of a plurality of video streams originating from participants of a multimedia network conference for forwarding to a client that can only receive the video stream of one participant at a time. In accordance with the invention, periodically, each of the participants is assigned a weight that is dynamically determined based on the participants' conferencing activity state data, which in turn are updated according to participant events associated with the video and audio streams. The video stream of the participant that has been given the highest weight is then selected for transmission to the client. It will be appreciated that there are various ways to assign weights to the participants, and it is not critical to the invention which way is chosen.

By way of example, the weight assignment process implemented in one embodiment is described below. In this embodiment, several participant events are defined and used to update activity states of the participant. The activity states of the participant are then used in the weight assignment process. In this regard, the multimedia streams received by the bridge server from the multicast group include both data and control information. In response to changes in both of these pieces of information, the multicast conference server 122 generates the participant events. As a part of handling these events, the multicast conference server 122 updates a participant state table 150 associated with the conference. The participant events are described below.

Event Name Event Description

NewSubStream: The participant started sending video.

SubStreamRemoved: The participant stopped sending video.

NewParticipant: A new participant joined the conference.

ParticipantActive: The participant started talking (sending audio).

ParticipantInactive: The participant stopped talking (sending audio).

ParticipantLeave: The participant left the conference.

The participant state table 150 has an entry for each participant in the network conference. A row is created when a participant joins the conference, and is removed when the participant leaves the conference. Other information is filled in and updated as and when control information arrives in the media stream. Th control information is parsed by the multicast conference server 122 to identify the participant events.

Figure 4:
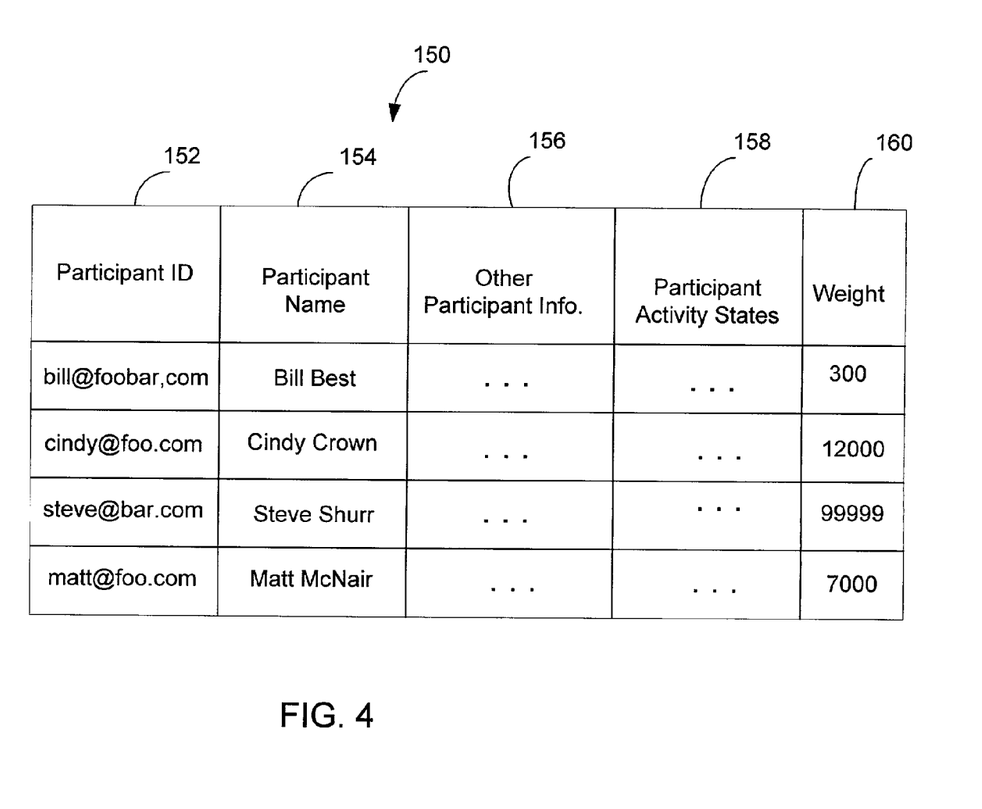
FIG. 4 shows an exemplary table containing information and states of participants of a multimedia conference.

An exemplary participant table 150 is shown in FIG. 4. In each entry of this table, the "Participant ID" field 152 contains a unique identification of the participant, and the "Participant Name" field 154 contains the name of the participant. The "Other Participant Information" field 156 contains more information about the participant, such as his/her telephone number, facsimile number, and location, etc. This information is maintained by the bridge service for information and display purposes. The "Activity State Information" 158 field is used to keep track of statistics or the values of "activity state variables" regarding the participant. The activity state variables of the participant are updated according to participant events. The activity state variables used in the embodiment are described below.

State variable name: Description

SecsSinceLastStoppedShowing: Time in seconds since this participant was last shown.

SecsSinceLastStartedShowing: Time in seconds for which this participant's video has been showing to the client by the active talker algorithm.

SecsSinceLastBecameActive: Time in seconds since this participant started talking (i.e., sending audio).

SecsSinceLastBecameInactive: Time in seconds since this participant stopped talking (i.e., sending audio).

IsTalking: A Boolean number indicating whether this participant is currently talking (i.e., sending audio).

IsSendingVideo: Boolean indicating whether this participant is currently sending video.

IsShowing: A Boolean number indicating whether this participant is the one whose video is currently being chosen to be sent to the client by the video stream selector.

These state variables are updated as a part of processing the participant events mentioned above.

Figure 5:
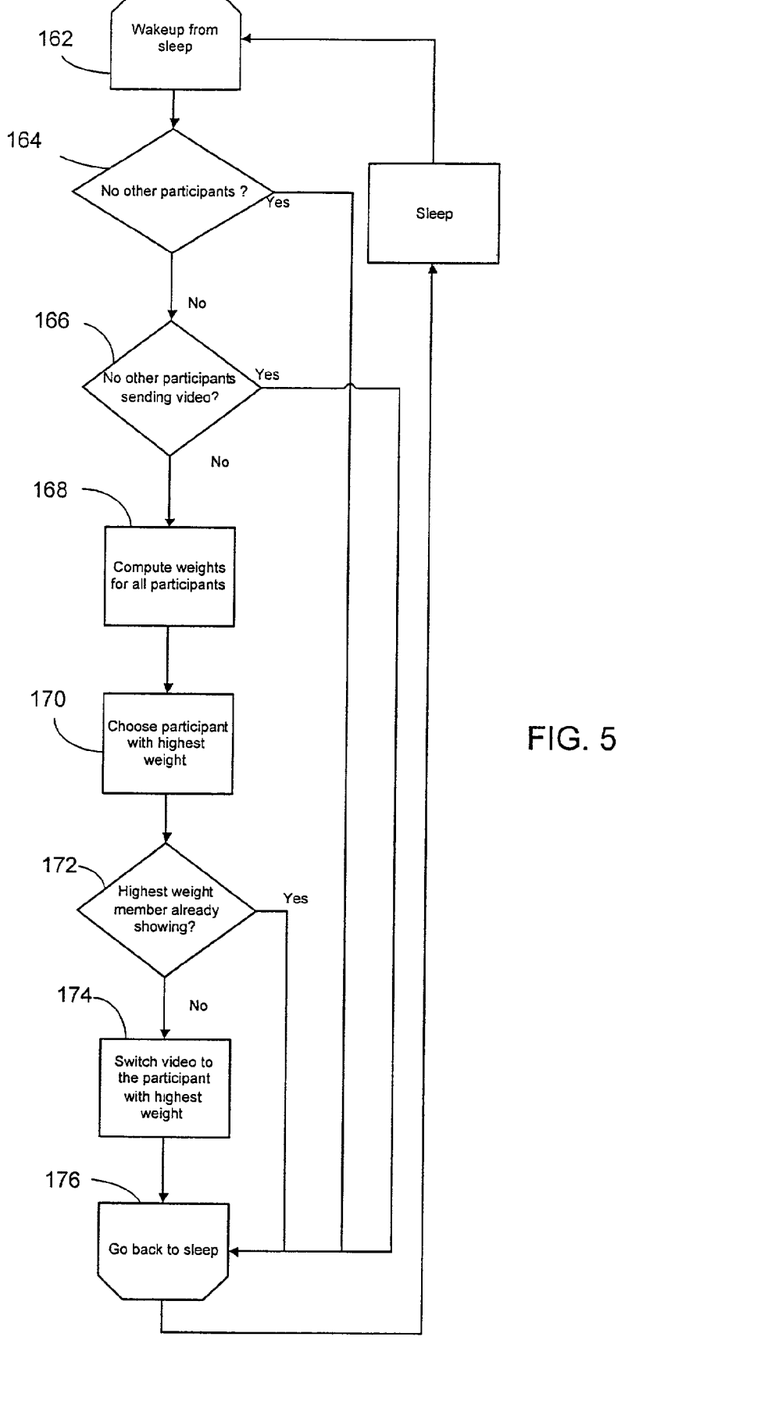
FIG. 5 is a flowchart showing a process performed by the bridge server for selecting one of the video streams originating from participants of the multimedia conference for transmission to the client.

Turning now to FIG. 5, in the described embodiment, the bridge service 126 has a background thread called Stream Selection that wakes up from sleep (step 162) periodically, such as every one to several seconds. After waking up, the Stream Selection determines whether there are other participants of the conferences (step 164) and, if so, whether those participants are sending video signals (step 166). If there are no other participants or none of the participants is sending video signals, there is no need for any video switching and the thread goes back to sleep (step 176). If there are video signals sent by conference participants so that video switching is needed, the Stream Selection goes through the entries in the participant state table described above and computes the weight for each participant based on the states of the participant (step 168). The weight computation will be described in greater detail below. After having computed the weight for each of the participants in the table, the participant with the highest weight is identified (step 170). The Stream Selection then determines whether the video substream associated with this participant is already being sent to the client (step 172). If so, the Stream Selection does nothing further and goes back to sleep (step 176). Thus, that participant will continue to be shown to the client at least until the next time the Stream Selection wakes up. If, on the other hand, the video substream of another participant is currently being sent to the client, the Stream Selection switches to the video substream of the participant with the highest weight. The Stream Selection then goes back to sleep.

The computation of weights for the participants is a function of the participants' activity state variables mentioned above and a set of tunable parameters called "participant selection control parameters." The selections made by the Stream Selection and hence the video switching experience of the client can be controlled by tuning these parameters to affect the outcome of the weight computation. These parameters are described in the table below, with exemplary values provided for illustration purposes:

TABLE 1

| Participant Selection Control | Description | exemplary value (seconds) |
| --- | --- | --- |
| Minimum Shown Time | Minimum time that a selected participant's video stream will be displayed on the client screen | 8 |
| Minimum Shown Time If Active | Minimum time that a selected participant's video stream will be displayed on the client screen if the participant is still talking for this period of time | 15 |
| Active Talker Callback Interval | Time period for which the Stream Selection thread will go to sleep before it wakes up again to compute weights and switch video | 1 |
| Active Cycle Time | The time period that an actively talking participant's video stream is displayed by the client if only this participant is talking | 300 |
| Inactive Cycle Time | The time period that each participant's video stream is displayed if none of the participants is talking | 180 |
| Complete Active Cycle Time | Control that helps enforce Active Cycle Time for participants. This should be less than Maximum Inactive Not Showing Time | 7000 |
| Complete Inactive | Control that helps enforce Inactive Cycle Time for participants. This | 4000 |

TABLE 1-continued

| Participant Selection Control | Description | exemplary value (seconds) |
| --- | --- | --- |
| Cycle Time | should be less than Complete Active Cycle Time | |
| Maximum Inactive Not Showing Time | The maximum time that can elapse before a participant who is not at all talking (sending audio) is selected | 12000 |
| MAXWEIGHT | A very large number | 9999999 |
| MINWEIGHT | A very small number | 0 |

Although the table provides exemplary values of the control parameters, it will be appreciated that the values of the control parameters can be tailored to obtain desired video stream switching behavior. In one embodiment, the parameters can be set for each network conference to suit the nature or format of the network conference. The values of the parameters may be specified when the conference is set up.

Figure 6:
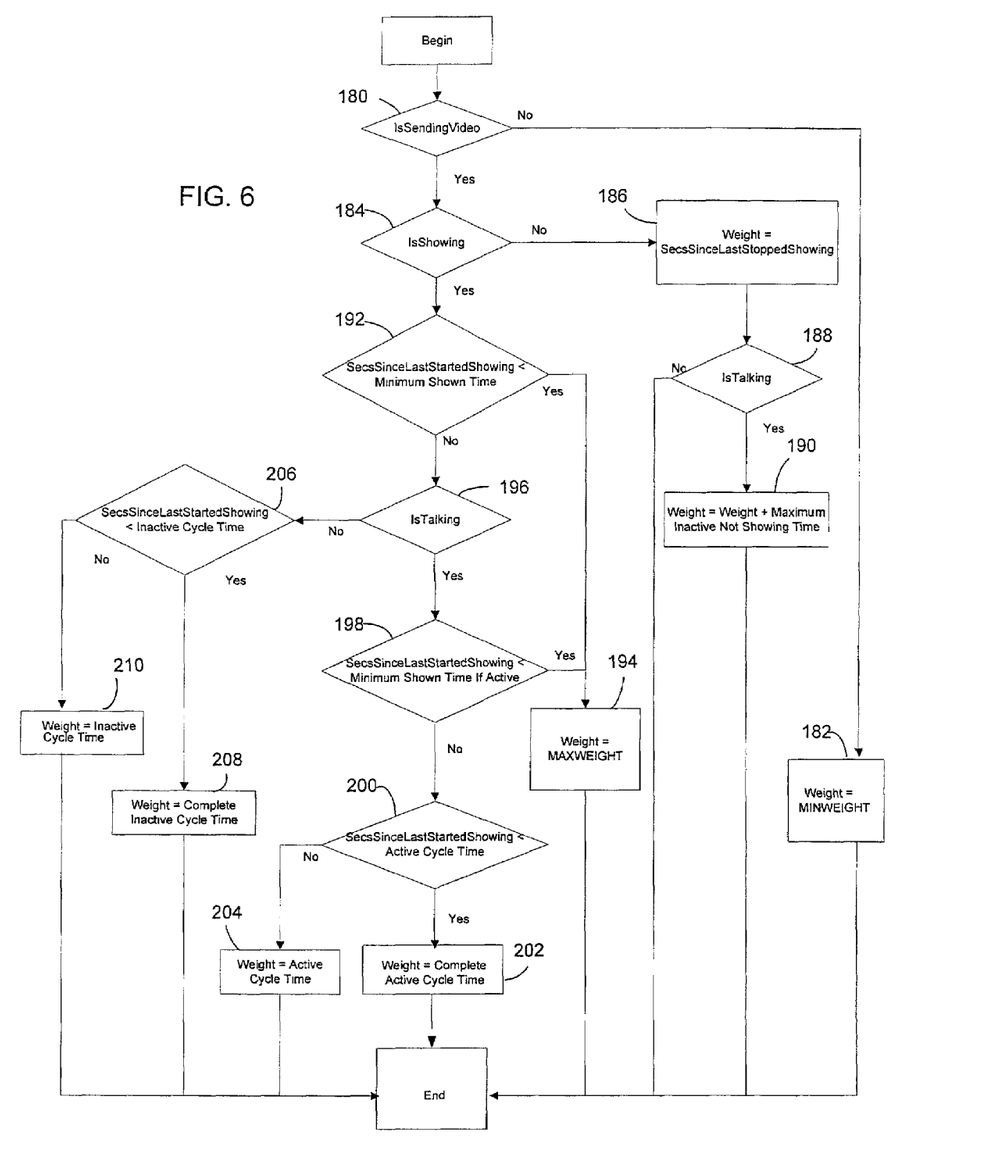
FIG. 6 is a flowchart showing a process performed by the bridge server to compute weights of the participants of the multimedia conference for selecting one of the video streams of the participants for viewing.

The process of computing the weight for each participant is shown in FIG. 6. For a given participant, the Stream Selection first checks whether that participant is sending video signals (step 180). If the participant is not even sending video signals, the weight of the participant is assigned the MINWEIGHT (step 182), which is a very small number, to ensure that this participant will not be selected. If the participant does send video signals, the Stream Selection determines (step 184) whether this participant is currently being shown (i.e., the video substream of this participant is being sent to the client). If not, the weight of the participant is set (step 186) to the value of SecsSinceLastStoppedShowing, which is the number of seconds since the last time this participant was shown. This number increases the longer the participant is not shown, making the participant more likely to be selected. It is then determined whether this participant is talking (i.e., transmitting audio signals) (step 188). If the participant is talking, then the amount Maximum Inactive Not Showing Time is added to the weight (step 190). This ensures that a participant who is talking but not being shown will be selected over other participants who are not talking and not being shown.

If the participant is being shown (step 184), it is determined whether the SecsSinceLastStartedShowing value is less than the Minimum Shown Time (step 192). If so, the weight is set to be MAXWEIGHT (step 194), which is a very large value, to ensure that this participant will be selected. This guarantees that a participant, once selected for viewing, will be shown for at least the Minimum Shown Time (e.g., 8 seconds).

On the other hand, if the SecsSinceLastStartedShowing has exceeded the Minimum Shown Time (step 192), a decision is made as to whether the participant should be shown for more time. If the participant is talking (step 196), it is determined whether the value of SecsSinceLastStartedShowing is less than Minimum Shown Time If Active (step 198). Here "active" means that the participant is talking (or otherwise transmitting sound). If so, the weight is set (step 194) to MAXWEIGHT such that the participant will be selected. The effect of this is that the participant is allowed to be shown for at least the period of Minimum Shown Time If Active if he/she continues to talk. The parameters Minimum Shown Time and Minimum Shown Time If Active help to prevent a flurry of abrupt jumps from one participant to another. For example, if these parameters are not used and the switching is based only on which participant happens to be making the loudest sound, then the screen image may be switched back and forth too quickly and too frequently between the talking participants, resulting in an unpleasant client experience.

If, however, the participant is being shown and talking but has been shown for longer than the Minimum Shown Time If Active (step 198), then it is determined (step 200) whether the value of SecsSinceLastStartedShowing is less than Active Cycle Time, which functions roughly as an upper limit of how long a participant who is continuously talking should be continuously shown. If the participant has been shown for less than Active Cycle Time, the weight is set (step 202) to Complete Active Cycle Time, which is a relative large value, to enhance the likelihood that the active participant will be selected again. On the other hand, if SecsSinceLastStartedShowing has already exceeded Active Cycle Time (step 200), the weight is set to Active Cycle Time (step 204). Since Active Cycle Time is not very large, it likely that the participant will not be selected again.

If the participant is being shown but not talking (step 196), it is determined whether SecsSinceLastStartedShowing is less than Inactive Cycle Time (step 206). If so, the weight is set (step 208) to Complete Inactive Cycle Time, which is a relatively large number for enhancing the likelihood that the participant will be selected. If, however, the value of SecsSinceLastStartedShowing is greater than Inactive Cycle Time, the weight is set to Inactive Cycle Time (step 210). As Inactive Cycle Time is a relatively small number, it is likely that this participant will not be selected again.

The Stream Selection goes through the process shown in FIG. 6 for each participant of the conference to compute a weight for that participant. As described above, after the weights for all the participants have been assigned, the Stream Selection selects the one with the highest weight and forwards the video substream from that participant to the client.

Figure 7A:
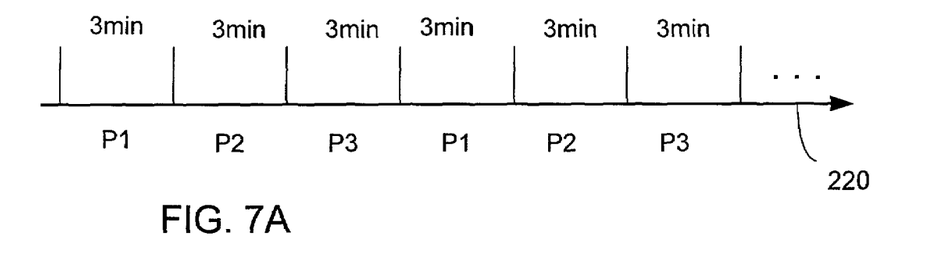
FIG. 7 is a schematic diagram showing exemplary timelines for illustrating the selection of video streams in different scenarios of conference dynamics.
Figure 7B:
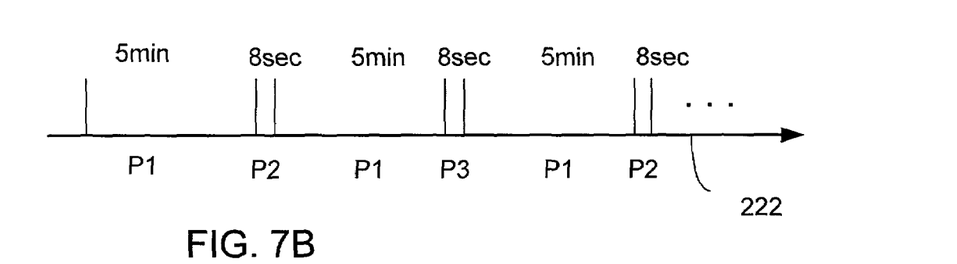
Figure 7C:
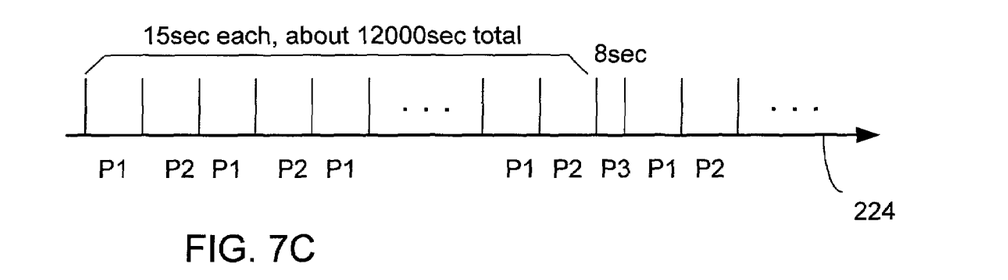

FIGS. 7A-C shows several exemplary timelines for illustrating the user experience based on the weight assignment of FIG. 6 in scenarios corresponding to different cases of conference dynamics. In these examples, P1, P2 and P3 are the participants that the user of the client 112 sees in her conference call. For simplicity of illustration, the user of the client 112 is assumed to be an observer and never talks. The three timelines shown in FIGS. 7A-C, respectively, identify each participant whose video stream is chosen by the Participant Selector, and the duration for which the video is displayed at the client.

In the first case corresponding to the time line 220 shown in FIG. 7A, none of P1, P2 and P3 is talking. Each of these three participants will in turn be shown for 3 minutes (i.e., 180 seconds, the selected value of Inactive Cycle Time). In the second case corresponding to the timeline 222 shown in FIG. 7B, only P1 is talking continuously, while P2 and P3 never talk. In this case, P1 is shown repeatedly, each time for 5 minutes (i.e., 300 seconds, the value of Active Cycle Time), while P2 and P3 are alternatingly shown for 8 seconds (the value of Minimum Shown Time) each between the periods in which P1 is shown.

In the third case corresponding to the timeline 224 shown in FIG. 7C, P1 and P2 are simultaneously and continuously talking, while P3 never talks. In this case, P1 and P2 are substantially alternatingly shown, each time for 15 seconds (the value of Minimum Shown Time If Active). P3, in contrast, is shown once in about every 12000 seconds (the value of Maximum Inactive Not Showing Time).

Figure 8:
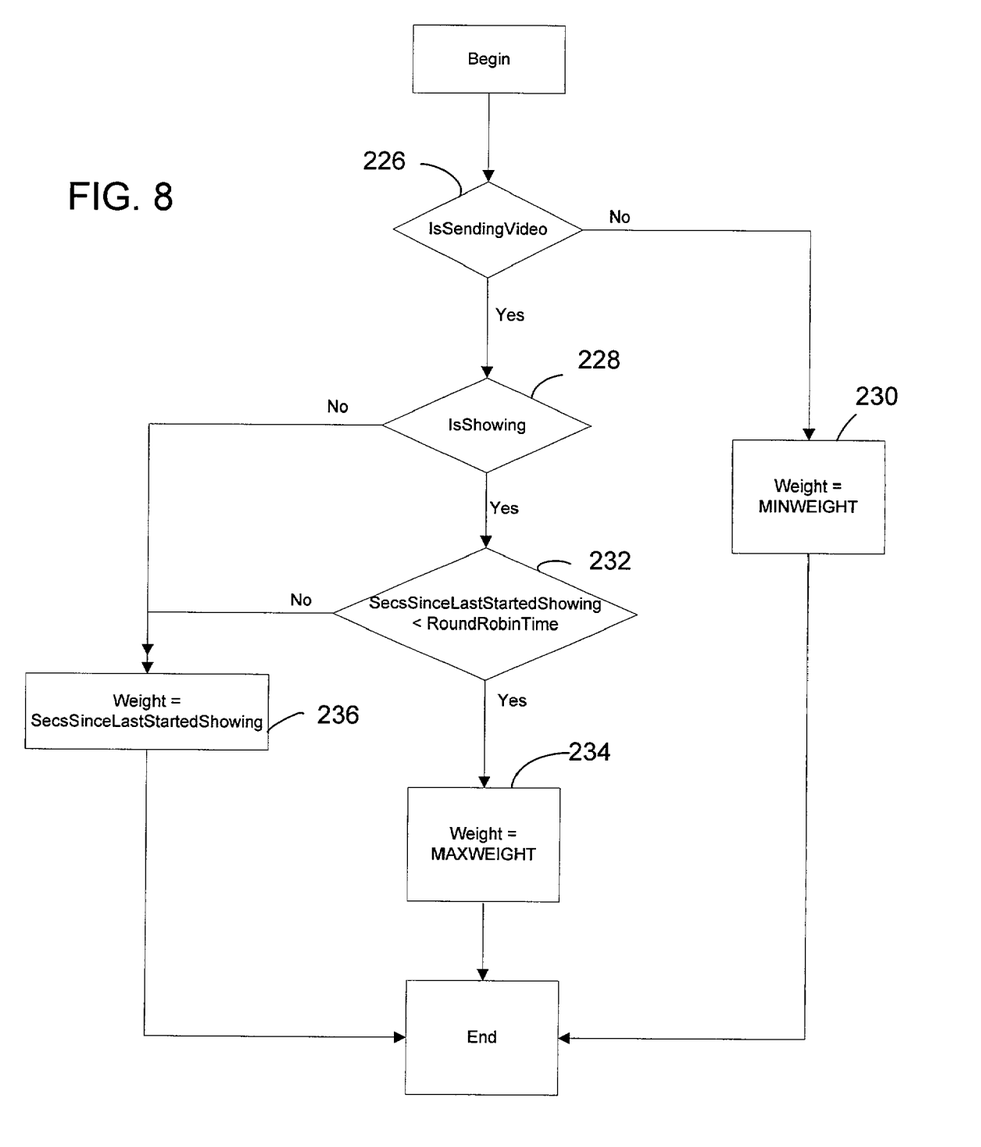
FIG. 8 is a flowchart showing a different method for the bridge server to assign weights to participants of a conference for video stream selection.

It will be appreciated that the weight assignment scheme described above in connection with FIG. 6 is provided only as an example, and many other weight assignment algorithms can be employed in the video stream selection according to the invention. For example, FIG. 8 shows the process of weight assignment for very simple round-robin switching scheme that shows each participant's video stream for an equal amount of time, irrespective of who is the current active talker. In contrast to the embodiment described above, this scheme has only one participant selection control parameter called RoundRobinTime, which is a quantum or time slice for which each selected active talker will be displayed on client's screen. This time slice may be, for example, 30 seconds.

Referring to FIG. 8, the weight assignment process is performed for each of the participants of the conference. It is first determined whether the participant is sending video (step 226). If not, the weight is set to MINWEIGHT so that the participant will not be selected (step 230). If the participant is sending video, it is determined whether the video substream of that participant is currently shown (step 228). If so, it is determined whether the value of SecsSinceLastStartedShowing (i.e., how long this participant has been shown) is less than RoundRobinTime (step 232). If so, the weight is set to MAX-WEIGHT (step 234) so that the participant will continue to be shown. On the other hand, if SecsSinceLastStartedShowing has exceeded RoundRobinTime, the weight is set to SecsSinceLastStartedShowing (step 236). Also, if the participant is not being shown (step 228), the weight is set to SecsSinceLastStartedShowing (step 236). In this way, the weight of a participant who is not being shown will increase with time.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A system for conducting a multimedia conference, comprising:
 a plurality of participants each providing multimedia conferencing data including a video signal and an audio signal;
 a client in conference with the plurality of participants, the client capable of receiving the video signal corresponding to one of the plurality of participants at a time;
 a participant selection control parameter stored in a memory for tuning a video switching stream behavior, wherein the participant selection control parameter affects an outcome of a weight computation, said participant selection control parameter received when the multimedia conference is set up, said participant control selection parameter having a static display constraint on a selection of a video signal;
 a participant state table stored in a memory and indicating an activity state variable for each of the plurality of participants, said activity state variable including values and statistics associated with each of the plurality of participants' video signal and audio signal; and
 a bridge server connected to the plurality of participants through a network and having a point-to-point connection with the client, the bridge server assigning a predetermined weight to at least one of the plurality of participants for a duration specified by the static display constraint, receiving simultaneously the multimedia conferencing data including the video signal from each of the plurality of participants, updating the activity state variable stored in the memory for each of the plurality of participants in the participant state table according to changes in a data information and a control information of each of the plurality of participants' video signal and audio signal, periodically computing a weight of said each of the plurality of participants based on the activity state variable of said each of the plurality of participants and the participant selection control parameter, identifying a participant having a highest weight among the plurality of participants, and selecting from the received multimedia conferencing data the video signal corresponding to the identified participant having the highest weight for transmission to the client for viewing.

2. The system of claim 1, wherein the plurality of participants and the bridge server are connected through a multicast network.

3. The system of claim 1, wherein the bridge server further transmits to the client an audio stream containing a mixture of the audio signals from the participants of the network conference.

4. The system of claim 1, wherein updating the activity state variable stored in the memory for each participant includes:
- determining a shown length of time for which the video signal of said each participant has been shown to the client if said each participant is currently being shown to the client; and
- wherein the computing of the weight of said each participant includes:
- determining if the shown length of time is less than a first participant selection control parameter of a minimum shown time, and setting the weight to a second participant selection control parameter of a maximum weight if the shown length of time is less than the first participant selection control parameter.

5. The system of claim 4, wherein updating the activity state variable stored in the memory for each participant includes:
- determining a talking length of time for which said each participant has been talking; and
- wherein computing the weight of said each participant includes:
- if the shown length of time is more than the first participant selection control parameter, then determining if the talking length of time is less than a third participant selection control parameter of a minimum shown time if active, and setting the weight to the second participant selection control parameter if the talking length of time is less than the third participant selection control parameter.

6. The system of claim 5, wherein the computing of the weight of said each participant by the bridge server includes:
- if the shown length of time is more than the first participant selection control parameter and the talking length of time is more than the third participant selection control parameter, then determining if the shown length of time is less than a fourth participant selection control parameter of an active cycle time indicating an upper limit of time for showing a video signal of an active talking participant, and if the shown length of time is less than the fourth participant selection control parameter, then setting the weight to a value increasing the likelihood that said each participant will be identified as having the highest weight.

7. The system of claim 6, wherein the computing of the weight of said each participant includes:
- if the shown length of time is more than the first participant selection control parameter and the talking length of time is more than the third participant selection control parameter and the shown length of time is more than the fourth participant selection control parameter, then setting the weight to a value decreasing the likelihood that said each participant will be identified as having the highest weight.

8. The system of claim 1, wherein the multimedia conferencing data received by the bridge server include a combined video stream having substreams corresponding to the participants, and wherein the bridge server demultiplexes the combined video stream into a plurality of individual video signals each including one of the substreams in the combined video stream.

9. The system of claim 1, wherein the participant selection control parameter includes at least one member of a group comprising: a maximum weight; a minimum weight; a minimum time that a selected participant's video signal will be displayed on a client screen; a minimum time that a selected participant's video signal will be displayed on the client screen if the participant is still talking; a time period between computing weights and switching video; a time period that an actively talking participant's video signal is displayed on the client screen if only the actively talking participant is talking; a time period that each participant's video signal is displayed if none of the participants is talking; a value used to enforce a time period that the actively talking participant's video signal is displayed on the client screen if only the actively talking participant is talking, said value being less than a maximum time that can elapse before a participant who is not talking is selected; a value used to enforce a time period that each participant's video signal is displayed on the client screen if none of the participants is talking, said value being less than the time period that each participant's video signal is displayed if none of the participants is talking; and a maximum time that can elapse before a participant who is not talking is selected.

10. The system of claim 1, wherein the activity state variables includes at least one of a group comprising: a time value for which the participant's video signal was last displayed on a client screen; a time value for which the participant's video signal has been displayed on the client screen; a time value since the participant started talking; a time value since the participant stopped talking; a Boolean value indicating whether the participant is currently talking; a Boolean value indicating whether the participant is currently sending a video signal; and a Boolean value indicating whether the participant's video signal is currently being displayed on the client screen.

11. A method for selecting one video signal from a plurality of video signals for forwarding to a client, each video signal corresponding to a participant of multiple participants of a multimedia conference, said method comprising:
- when the multimedia conference is being set up, receiving a participant selection control parameter for the multimedia conference, said participant selection control parameter having a static display constraint of selecting the one video signal;
- assigning a predetermined weight to at least one of the multiple participants for a duration specified by the static display constraint;
- receiving simultaneously a multimedia conferencing data from the multiple participants, the multimedia conferencing data including the plurality of video signals from the multiple participants;
- monitoring participant events of the multimedia conference, said participant events associated with the multimedia conferencing data of the multiple participants, said participant events being generated in response to changes in a data information and a control information of the multimedia conferencing data received from the multiple participants;

providing a participant state table associated with the multimedia conference indicating an activity state variable for each participant of the multimedia conference, said activity state variable including values and statistics associated with the participant's multimedia conference data;

updating at least one of the activity state variables in the participant state table according to the participant events;

periodically computing a weight for each of the multiple participants based on the activity state variable of said each participant and the participant selection control parameter;

identifying a participant having a highest weight among the multiple participants; and selecting from the received multimedia conferencing data the one video signal corresponding to the identified participant having the highest weight for viewing by the client.

12. The method of claim 11, wherein the multiple participants are connected to a bridge server through a multicast network.

13. The method of claim 12, further comprising transmitting to the client an audio stream containing a mixture of audio signals from the multiple participants of the network conference.

14. The method of claim 11, wherein the computing the weight comprises:

determining whether each participant's activity state variable indicates the participant is currently being shown to the client, wherein if a first participant's activity state variable indicates the first participant is not being shown to the client and the first participant is talking, a value for the participant selection control parameter for a maximum time that can elapse before a second participant who is not talking is selected is added to the first participant's weight.

15. The method of claim 11, wherein the updating the activity state variable comprises:

determining a value for the activity state variable for a length of time for which said each participant has been shown to the client if said each participant is currently being shown; and determining whether said each participant is talking;

wherein the computing the weight comprises:

if the participant is not talking and the value of the activity state variable is less than a first value for the participant selection control parameter for a time period that each participant's video signal is displayed if none of the participants is talking, setting the weight to a second value for the participant selection control parameter for enhancing a likelihood that the participant will be selected; and if the participant is not talking and the value of the activity state variable is greater than the first value for the participant selection control parameter, setting the weight to a third value for the participant selection control parameter for enhancing a likelihood that the participant will not be selected.

16. The method of claim 11, wherein the updating the activity state variable comprises:

determining a value for the activity state variable indicating whether said each participant is not sending video; and wherein computing the weight for each of the participants comprises:

if the value for the activity state variable indicates said each participant is not sending video, setting the weight to a value of the participant selection control parameter for a minimum weight.

17. The method of claim 11, wherein the updating the activity state variable comprises:

determining a value for the activity state variable for a length of time for which said each participant has been shown to the client; and wherein computing the weight for each of the participants comprises:

if the value for the activity state variable is less than a first value for the participant selection control parameter for a minimum time that a selected participant's video signal will be displayed on the client screen, setting the weight to a second value of the participant selection control parameter for a maximum weight.

18. The method of claim 11, wherein the multimedia conference data includes a combined video stream containing multiple substreams, each substream corresponding to a video signal of one of the multiple participants, and wherein the receiving includes demultiplexing the combined video stream into the plurality of video signals, each video signal including one of the substreams of the combined video stream.

19. The method of claim 11, wherein the participant selection control parameter includes at least one member of a group comprising: a maximum weight; a minimum weight; a minimum time that a selected participant's video signal will be displayed on a client screen; a minimum time that a selected participant's video signal will be displayed on the client screen if the participant is still talking; a time period between computing weights and switching video; a time period that an actively talking participant's video signal is displayed on the client screen if only the actively talking participant is talking; a time period that each participant's video signal is displayed if none of the participants is talking; a value used to enforce a time period that the actively talking participant's video signal is displayed on the client screen if only the actively talking participant is talking, said value being less than a maximum time that can elapse before a participant who is not talking is selected; a value used to enforce a time period that each participant's video signal is displayed on the client screen if none of the participants is talking, said value being less than the time period that each participant's video signal is displayed if none of the participants is talking; and a maximum time that can elapse before a participant who is not talking is selected.

20. The method of claim 11, wherein the activity state variables includes at least one of a group comprising: a time value for which the participant's video signal was last displayed on a client screen; a time value for which the participant's video signal has been displayed on the client screen; a time value since the participant started talking; a time value since the participant stopped talking; a Boolean value indicating whether the participant is currently talking; a Boolean value indicating whether the participant is currently sending a video signal; and a Boolean value indicating whether the participant's video signal is currently being displayed on the client screen.

* * * * *

UNITED STATES PATENT AND TRADEMARK OFFICE
CERTIFICATE OF CORRECTION

PATENT NO.       : 7,668,907 B1                                        Page 1 of 1
APPLICATION NO. : 09/931211
DATED            : February 23, 2010
INVENTOR(S)      : Janakiraman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Seventh Day of December, 2010

David J. Kappos
*Director of the United States Patent and Trademark Office*